(12) United States Patent
Mai

(10) Patent No.: US 10,870,229 B2
(45) Date of Patent: Dec. 22, 2020

(54) MOLD STACK FOR INJECTION MOLDING MACHINE

(71) Applicant: Husky Injection Molding Systems Ltd., Bolton (CA)

(72) Inventor: Arnold Heinz Mai, Irrel (DE)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 133 days.

(21) Appl. No.: 15/737,366

(22) PCT Filed: Jun. 1, 2016

(86) PCT No.: PCT/CA2016/050621
§ 371 (c)(1),
(2) Date: Dec. 18, 2017

(87) PCT Pub. No.: WO2017/004698
PCT Pub. Date: Jan. 12, 2017

(65) Prior Publication Data
US 2018/0162031 A1    Jun. 14, 2018

Related U.S. Application Data

(60) Provisional application No. 62/189,802, filed on Jul. 8, 2015.

(51) Int. Cl.
*B29C 45/33*    (2006.01)
*B29C 45/36*    (2006.01)
(Continued)

(52) U.S. Cl.
CPC ...... *B29C 45/4421* (2013.01); *B29C 45/2614* (2013.01); *B29C 45/36* (2013.01);
(Continued)

(58) Field of Classification Search
CPC . B29C 45/2602; B29C 45/04; B29C 45/4421; B29C 45/2614; B29C 45/36;
(Continued)

(56) References Cited

U.S. PATENT DOCUMENTS 3,555,606 A    1/1971   Hedgewick
3,904,165 A    9/1975   Den Boer
(Continued)

FOREIGN PATENT DOCUMENTS

JP    H0557760 A    3/1993

OTHER PUBLICATIONS

PCT International Search Report, Pengfei Zhang, 3 pages, dated Aug. 1, 2016.
(Continued)

*Primary Examiner* — Alison L Hindenlang
*Assistant Examiner* — Andrés E. Behrens, Jr.

(57) ABSTRACT

A mold stack for a mold comprises a mold core configured for reception in a mold cavity plate with an outer molding surface. The mold core comprises an inner core with a first tapered guide surface and an outer core with a second tapered guide surface. The inner core is received through a passage in the outer core. A spacer slidably supports the outer core on the inner core. The outer core is movable relative to the inner core between a molding position in which the inner and outer cores define a mold cavity with the outer molding surface, and an open position in which the outer core is extended relative to the inner core. In the molding position, the first and second tapered guide surfaces engage one another to align the inner and outer cores.

20 Claims, 16 Drawing Sheets

(51) Int. Cl.
  *B29C 45/40* (2006.01)
  *B29C 45/44* (2006.01)
  *B29C 45/26* (2006.01)
(52) U.S. Cl.
  CPC .............. *B29C 45/40* (2013.01); *B29C 45/33* (2013.01); *B29C 2045/4078* (2013.01)
(58) Field of Classification Search
  CPC ........ B29C 2045/4078; B29C 45/1742; B29C 45/1791; B29C 2045/2677; B29C 45/2675; B29C 45/2673; B29C 33/306
  See application file for complete search history.

(56) References Cited

U.S. PATENT DOCUMENTS

| | | | |
|---|---|---|---|
| 3,956,453 A * | 5/1976 | Stayton | B29C 33/52 264/219 |
| 4,422,995 A * | 12/1983 | Schad | B29C 45/045 249/122 |
| 46,109,621 | 9/1986 | Taber et al. | |
| 4,627,810 A * | 12/1986 | Von Holdt | B29C 45/4421 249/152 |
| 4,684,101 A * | 8/1987 | Wagner | B29C 45/2675 164/340 |
| 4,764,103 A | 8/1988 | Mitake | |
| 4,881,892 A | 11/1989 | Webster et al. | |
| 4,983,346 A | 1/1991 | Curliss et al. | |
| 5,053,182 A | 10/1991 | Hedgewick | |
| 5,750,161 A * | 5/1998 | Schock, Jr. | B29C 33/306 425/182 |
| 5,788,911 A * | 8/1998 | Nomura | B29C 45/2618 249/59 |
| 6,177,041 B1 | 1/2001 | Bietzer | |
| 6,238,202 B1 | 5/2001 | Joseph | |
| 6,390,800 B1 | 5/2002 | Brown et al. | |
| 6,551,093 B2 | 4/2003 | Taha | |
| 7,241,405 B1 * | 7/2007 | Crain | B23P 6/00 264/39 |
| 9,254,598 B2 * | 2/2016 | Mai | B29C 45/4407 |
| 2001/0028902 A1 | 10/2001 | Pascal et al. | |
| 2012/0135102 A1 * | 5/2012 | Glaesener | B29C 45/4421 425/556 |
| 2012/0235325 A1 | 9/2012 | Hickok et al. | |
| 2013/0175734 A1 | 7/2013 | Glaesener | |
| 2013/0243897 A1 | 9/2013 | McCready et al. | |
| 2015/0069662 A1 * | 3/2015 | Mai | B29C 45/43 264/328.1 |
| 2015/0360404 A1 * | 12/2015 | Kmoch | B29C 45/2675 425/577 |
| 2017/0334093 A1 * | 11/2017 | De Almeida | B29C 45/4407 |

OTHER PUBLICATIONS

European Search Report, Raicher, Gerald, dated Jan. 17, 2019, 7 pages.

\* cited by examiner

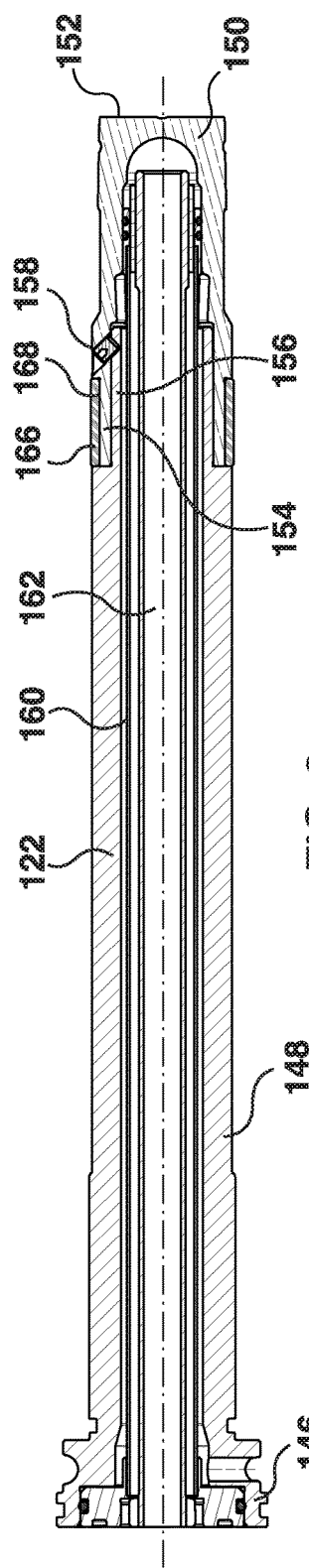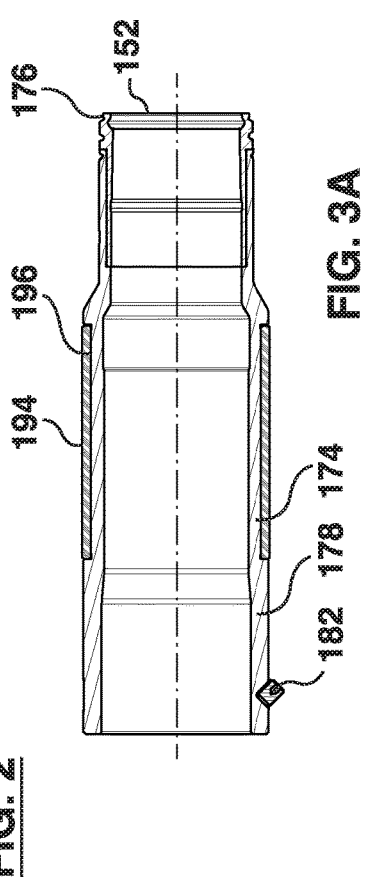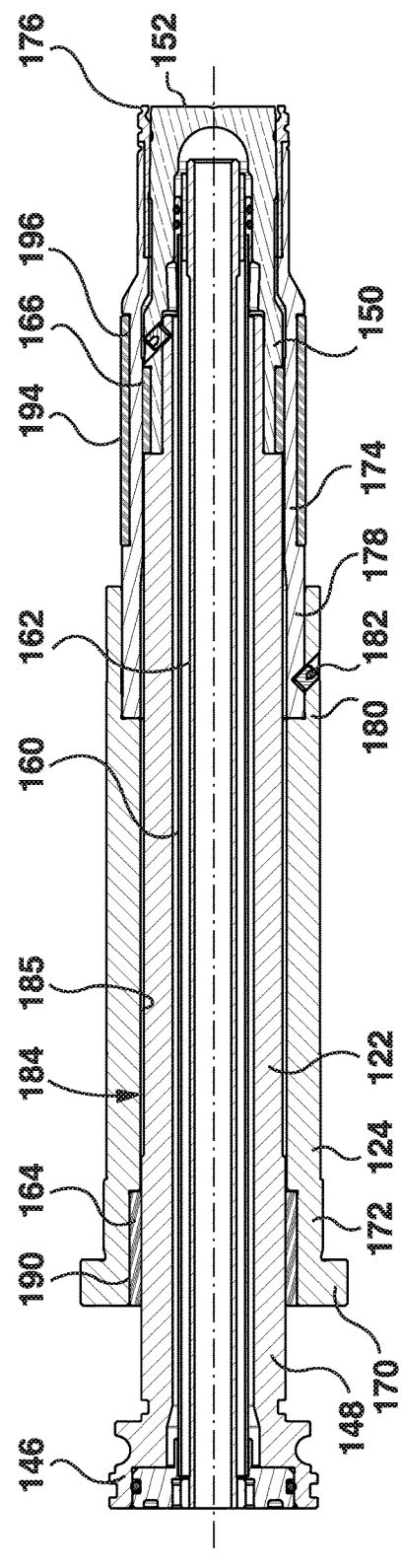

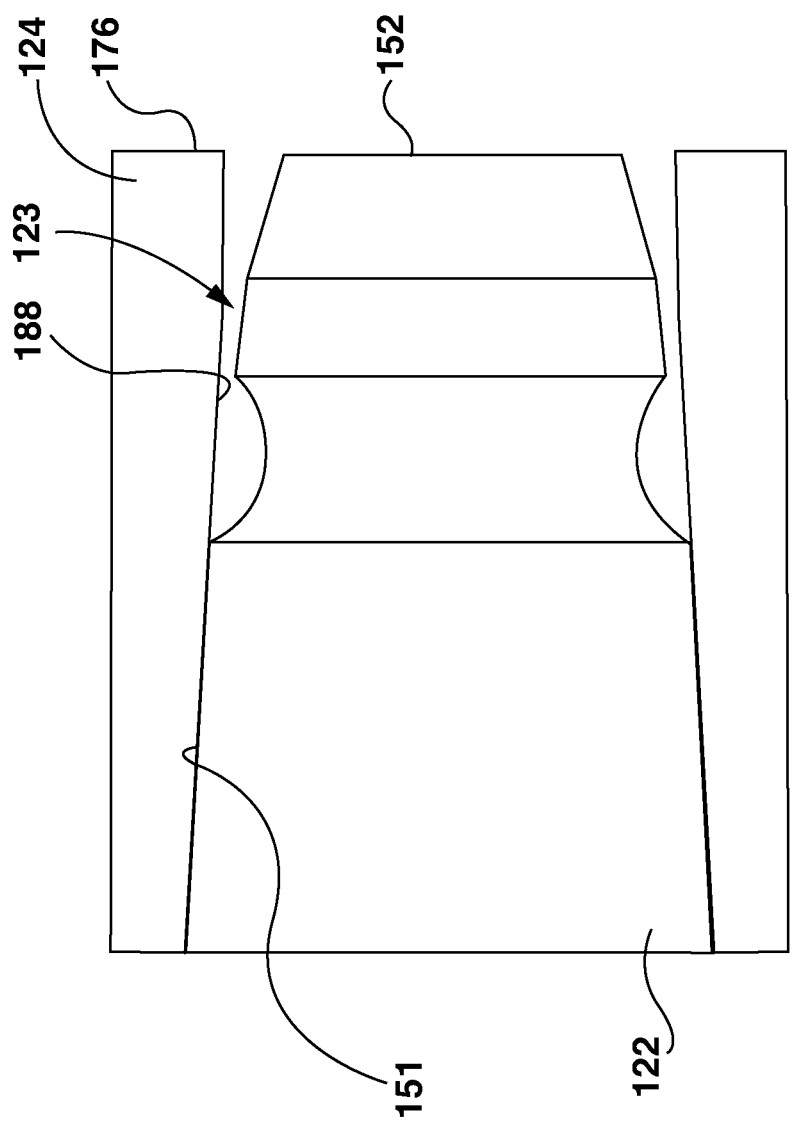

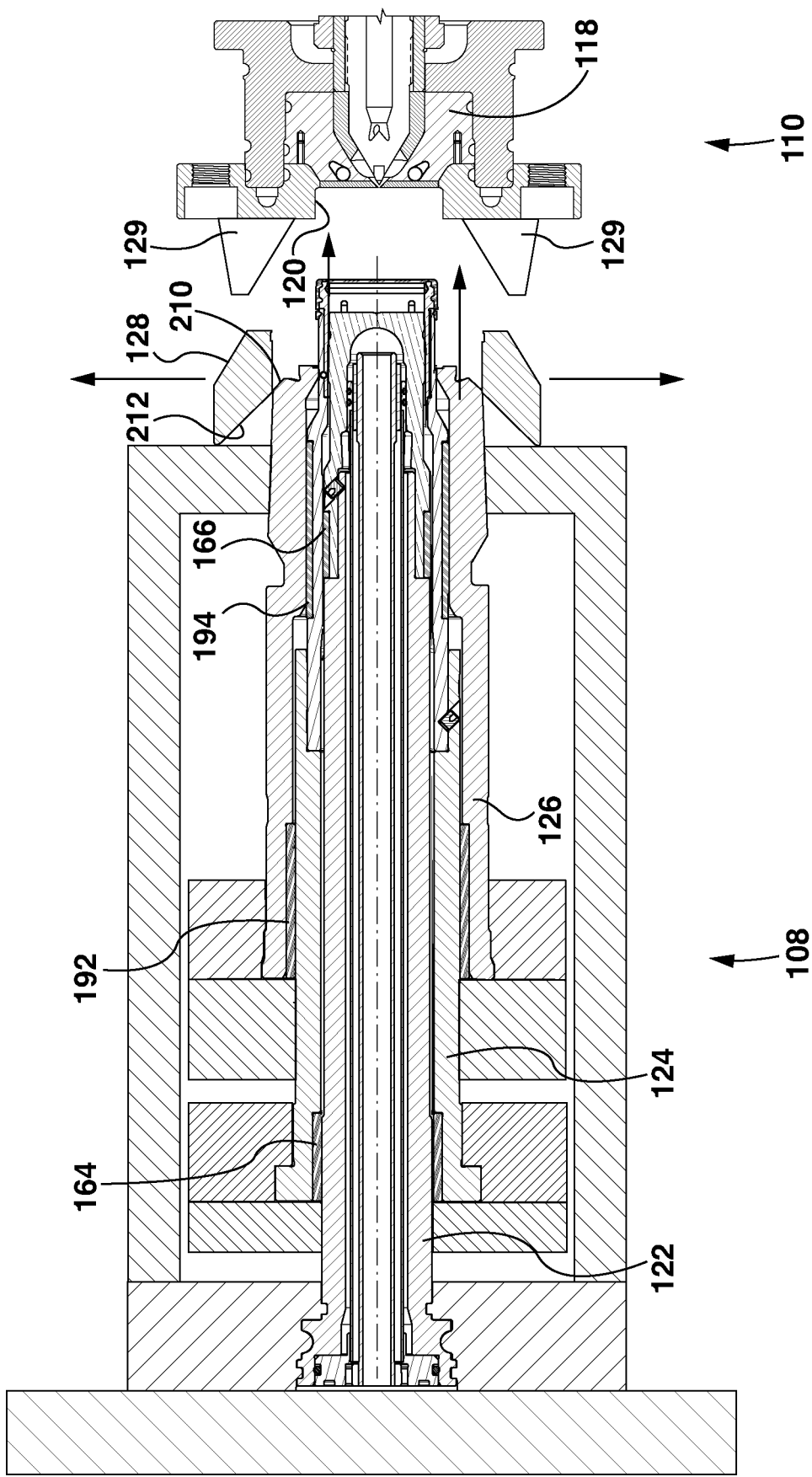

MOLD STACK FOR INJECTION MOLDING MACHINE

FIELD

This relates to injection molding, in particular, mold stacks for injection molding machines.

BACKGROUND

Injection molding machines typically include molds defined by a core portion and a cavity portion which fit together such that the core portion defines a mold inner surface and the cavity portion defines a mold outer surface. The cavity portion may be mounted to a fixed platen of an injection molding machine (via a mold shoe of a stationary mold half), and the core portion may be mounted to a movable platen of the injection molding machine (via a mold shoe of a moveable mold half), so that the mold may be opened and closed by reciprocating the movable platen.

A mold may include one or more movable components to allow ejection of parts after molding. For example, in order to mold parts with undercut geometry, a mold core may have movable components operable to define a molding surface during molding, and to open after molding in order to release molded parts. Moreover, the mold may have a movable stripper plate to push molded parts out of the mold, e.g. by moving a stripper ring.

Movement of mold components may cause friction and wear. Accordingly, typical mold components may require frequent lubrication. In addition, components may become misaligned during movement, which may further exacerbate wear. Unfortunately, many typical mold components require custom machining and replacing such worn components may therefore be time-consuming and costly and may require extended lead time for replacement parts to become available.

In addition, misalignment of mold components during molding may lead to poor molding conditions and part defects.

SUMMARY

An example mold stack for a mold comprises: a cavity plate having a mold cavity; a mold core configured for reception in the mold cavity the mold core comprising: a first core member having a first molding surface; a passage extending through the first core member, the passage having first tapered guide surface; a second core member received in the passage, the second core member having a second molding surface and a second tapered guide surface; a spacer slidably supporting the first core member on the second core member; the first core member movable relative to the second core member, between a molding position in which the first and second molding surfaces cooperate with the mold cavity to define a mold, and an open position in which the first core member extended relative to the second core member, wherein the first and second tapered guide surfaces engage one another to align the first and second core members in the molding position.

An example mold core for a mold stack of a mold, comprises: a first core member with an internal passage extending therethrough, the first core member having a first tapered guide surface in the internal passage; a second core member received in the internal passage, the second core member having a second tapered guide surface corresponding to the first tapered guide surface; a spacer interposed between the first core member and the second core member, the spacer slidably supporting the first core member on the second core member; the first core member movable relative to the second core member from an open position to a molding position, wherein in the molding position, the first and second core members cooperatively define a molding surface and the second tapered guide surface engages the first tapered guide surface to align the first and second core members.

BRIEF DESCRIPTION OF THE DRAWINGS

In the figures, which illustrate by way of example only, embodiments of this invention:

FIG. 2 is a cross-sectional view of a first sub-assembly of the mold stack of FIG. 1A;

FIG. 2A is a cross-sectional view of removable tip 150 and associated sub-components;

FIG. 3 is a cross-sectional view of a second sub-assembly of the mold stack of FIG. 1A;

FIG. 3A is a cross-sectional view of removable tip 178 and associated sub-components;

FIGS. 5A-5B are schematic views of an interface between an inner core and an outer core of the mold stack of FIG. 1A;

FIGS. 6A-6F are cross-sectional views of the mold and mold stack of FIG. 1A in various stages of moving from a molding position to a part removal position.

DETAILED DESCRIPTION

Figure 1A:
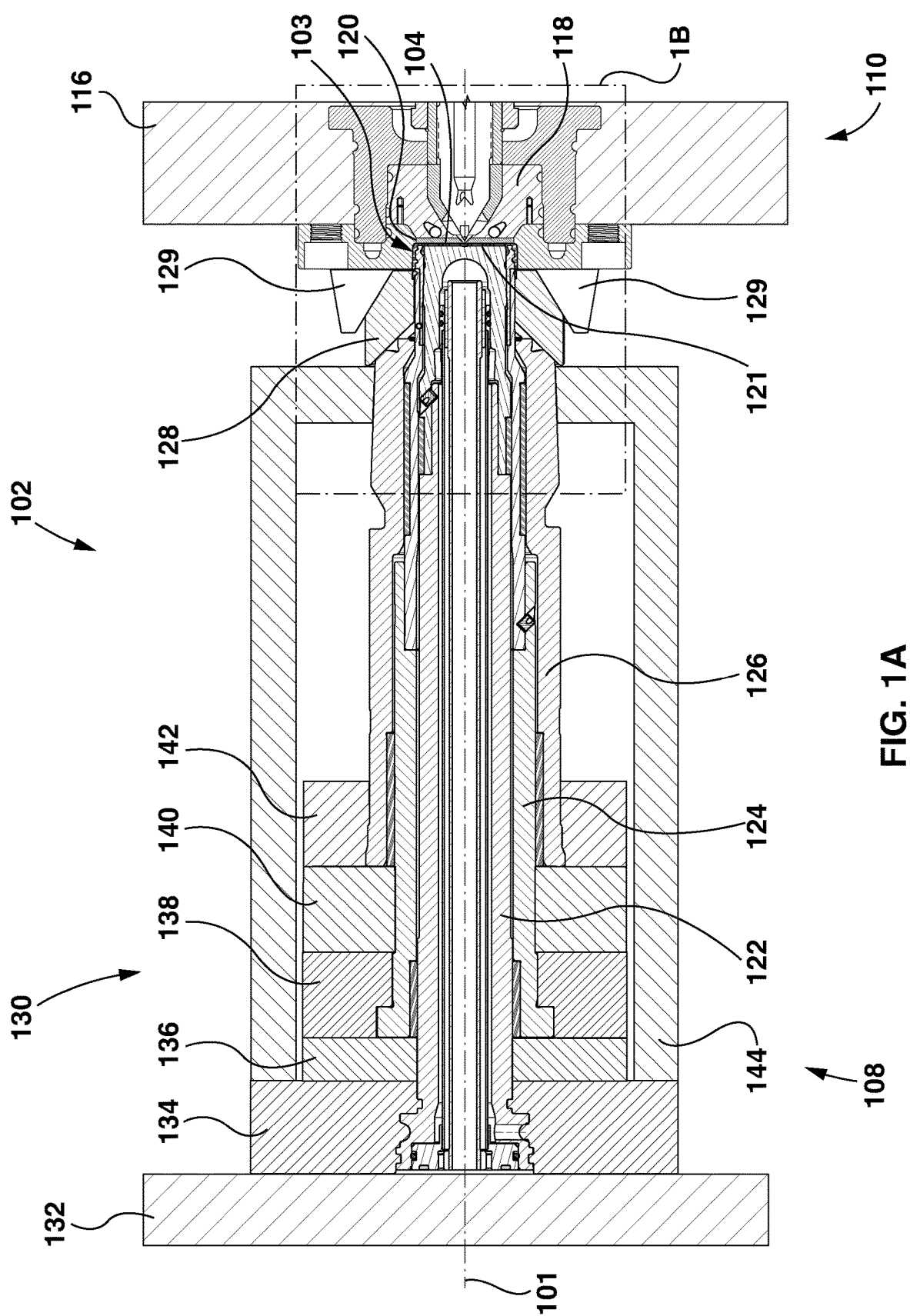
FIG. 1A is a cross-sectional view of a mold and of a mold stack therein.

FIG. 1A depicts a cross-sectional view of through a mold. The mold has a mold stack 102 configured to form a mold cavity 103 for molding parts 104. As depicted, mold cavity 103 is configured to form plastic closures for capping bottles. However, other embodiments may be configured to mold different parts 104.

Mold stack 102 has a core stack portion 108 and a cavity stack portion 110. Cavity stack portion 110 is arranged in a stationary mold half that is mountable to a fixed platen (not shown) of an injection molding machine (not shown). Core stack portion 108 is arranged in a moveable mold half that is mountable to a moving platen (not shown) of the injection molding machine. Mold stack 102 can be moved from a closed (molding) position (FIG. 1A) and an open (part removal) position (FIGS. 6F, 7A) by reciprocating moving platen (not shown) along a stroke axis 101. The moving platen may be reciprocated along a stroke axis 101, for example, by a linear actuator such as a hydraulic cylinder. Other suitable linear actuators will be apparent to skilled persons. As shown in FIG. 1A, mold stack 102 is in its closed (molding) state.

Cavity stack portion 110 includes a cavity assembly 118 arranged within a cavity plate 116 of the stationary mold half. Cavity stack portion 110 further includes a pair of slide actuators 129 (e.g. cams) which extend from cavity plate 116 toward core stack portion 108.

Core stack portion 108 includes a multi-part mold core including an inner core 122 and an outer core 124. Inner core 122 and outer core 124 together define an inner molding surface 121 for molding part 104. During molding, inner molding surface 121 forms part of the mold cavity 103 and defines the inner surface of part 104. Core stack portion 108 further includes a third core member, namely a stripper sleeve 126, and a pair of slides 128. Slides 128 cooperate with cavity assembly 118 to form an outer mold surface 120 during molding. The configuration of the mold cavity 103 is depicted in greater detail in FIG. 1B.

Components of core stack portion 108 are mounted to a mold shoe 130 attached to stationary platen (not shown). Mold shoe 130 includes a first core plate 132 and first clamp plate 134, a second core plate 136 and a second clamp plate 138, and a stripper retainer plate 140 and a stripper clamp plate 142. Mold shoe 130 further includes an ejector box 144 which is coupled to first clamp plate 134 so that second core plate 136, second clamp plate 138 stripper retainer plate 140 and stripper clamp plate 142 are retained in a space between ejector box 144 and first clamp plate 134.

First core plate 132 and first clamp plate 134 form a first core retainer, to which inner core 122 is mounted. Second core plate 136 and second clamp plate 138 form a second core retainer, to which outer core 124 is mounted. Stripper retainer plate 140 and stripper clamp plate 142 form a stripper retainer, to which stripper sleeve 126 is mounted.

Inner core 122, outer core 124 and stripper sleeve 126 are generally tubular. Inner core 122 is slidably received through an internal passage in outer core 124 and outer core 124 is slidably received through an internal passage in stripper sleeve 126.

Inner core 122 is fixed relative to the movable platen. Outer core 124 and stripper sleeve 126 are independently movable relative to the inner core 122 and relative to each other along stroke axis 101. In particular, outer core 124 and stripper sleeve 126, along with their respective retainers, may be axially extended from the molding position (FIG. 1A), to the part removal position (FIGS. 6F, 7A) and axially retracted from the part removal position to the molding position. As used herein, the term "axially retracted" refers to motion along stroke axis 101 in a direction away from the fixed platen (i.e. away from cavity plate 116, which is mounted to the fixed platen). The term "axially extended" refers to motion along stroke axis 101 in a direction toward the fixed platen (i.e. toward cavity plate 116). Outer core 124 and stripper sleeve 126 may, for example, be movable by a multi-stage actuator (not shown).

Figure 4:
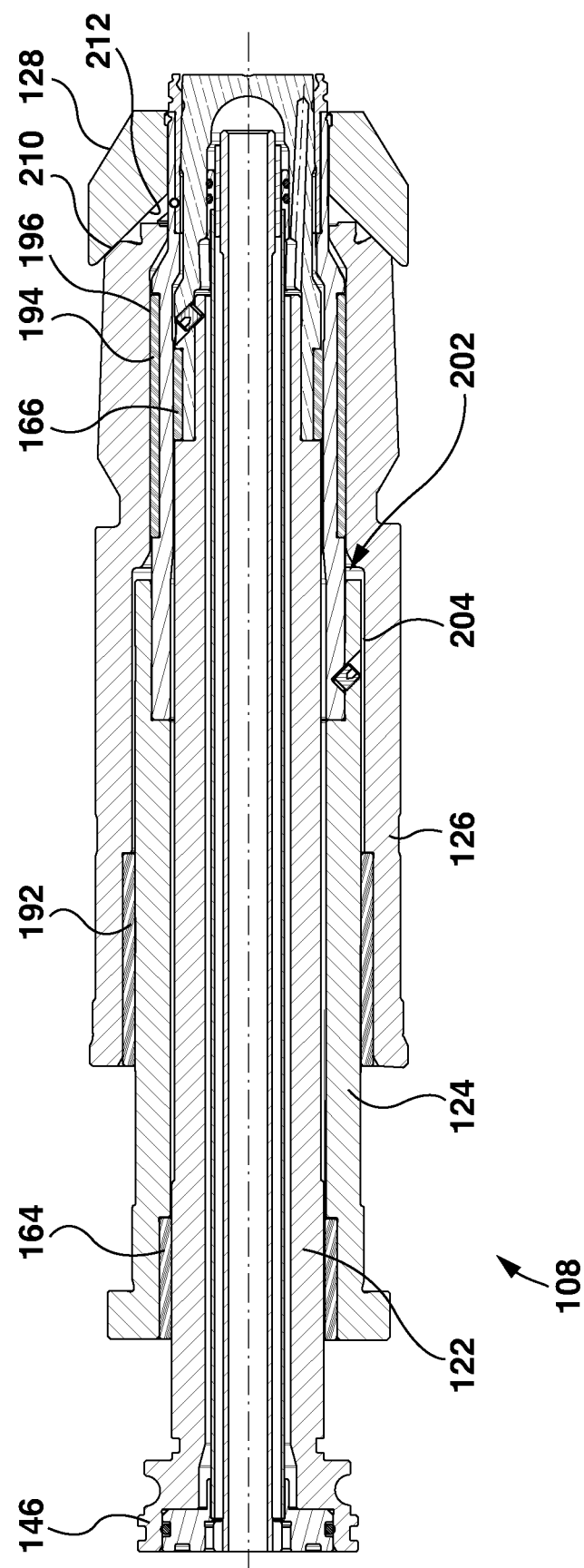
FIG. 4 is a cross-sectional view of a third sub-assembly of the mold stack of FIG. 1A.

FIGS. 2-4 depict sub-assemblies of core stack portion 108. Specifically, FIG. 2 is a cross-sectional view of inner core 122 and associated structures; FIG. 3 is a cross-sectional view of inner core 122 and outer core 124 and associated structures, and FIG. 4 is a cross-sectional view of the entirety of core stack portion 108. In each of FIGS. 2-4, components are shown in the molding position.

Figure 5A:
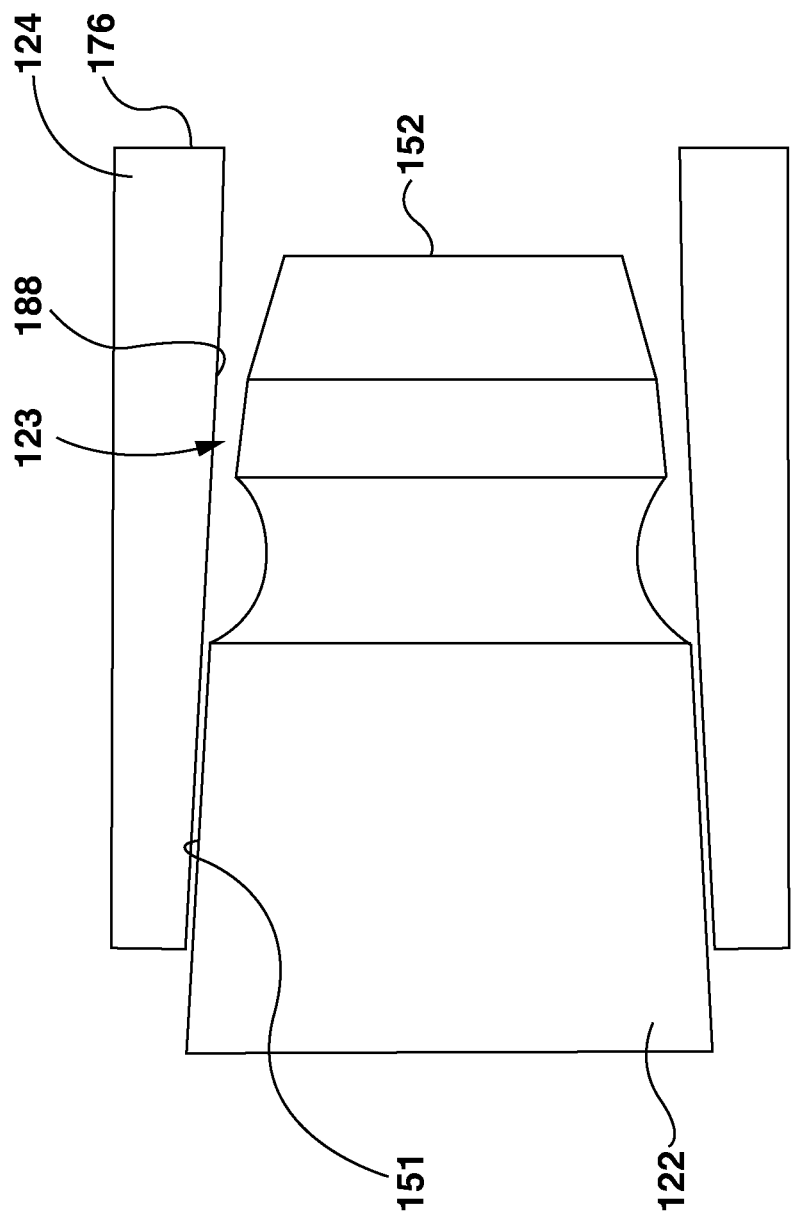

As depicted in FIG. 2, inner core 122 is generally tubular in shape. Inner core 122 has a flange 146 for mounting to first core plate 132. Inner core 122 has a body 148 and a tip 150. Inner core 122 may have a tapered guide surface 151 (FIGS. 5A-5B). Tapered guide surface 151 may be a shallow frustoconical region of the outer surface of inner core 122. A simplified view of tapered guide surface 151 is shown in FIG. 5, along with a tapered guide surface 188 of outer core 124, described further hereinafter. For purposes of illustration, the degree of taper is exaggerated in FIG. 5 Typically, guide surface 151 is tapered between 1 and 10 degrees, but the degree of taper may differ if the geometry of mold stack 102 permits.

A molding surface 152 is formed at the end of tip 150. In the molding position, molding surface 152 forms part of the mold cavity 103. Tip 150 may therefore be custom-machined for a specific type of part 104 to be molded. As will be apparent, dimensional accuracy of tip 150 and in particular, molding surface 152, may be important for producing quality parts 104. Accordingly, part or all of tip 150 may be formed, for example, by high-precision custom machining techniques.

As depicted, tip 150 is a separate component mounted to body 148. Tip 150 has a flange 154 that overlaps a corresponding flange 156 on body 148. Tip 150 is fixed to body 148 by one or more set screws 158 threaded to flanges 154, 156. In other embodiments, set screws 158 may be replaced by dowels or other fasteners which interlock tip 150 and body 148.

Body 148 may not form part of any molding surface. Accordingly, body 148 may be a standard part. Moreover, body 148 need not be customized for a particular type of part 104. Rather, in order to configure inner core 122 for a specific type of part 104, body 148 may be selected from among standard parts of one or more sizes, and a custom tip 150 may be attached to a standard body 148. As will be apparent, such an arrangement may limit the amount of custom machining required. However, in other embodiments, tip 150 and body 148 of inner core 122 may be machined together as a single unitary component.

Both body 148 and tip 150 may be formed from tool steel alloys of suitable hardness. Appropriate tool steel alloys will be apparent to skilled persons. Alternatively the tip may be made from a relatively thermally conductive material such as, for example, copper alloys.

Inner core 122 may have an interior cavity 160. A coolant circuit 162 may be defined in interior cavity 160 to circulate coolant fluid and maintain inner core 122 at a desired temperature for molding.

One or more spacers 166 may be mounted to inner core 122. Spacers 166 may be guiding elements providing radial alignment. Spacers 166 may support inner core 122 relative to outer core 124 and permit relative sliding movement between inner core 122 and outer core 124. As depicted, a spacer 166 may be received in a corresponding recess 168 formed in the outer surface of tip 150. Spacer 166 may, for example, be a plain or solid bearing without any rolling elements or a closed or split guide bushing. Spacer 166 may be formed as a sleeve extending entirely around the circumference of inner core 122. Alternatively, spacer 166 may be formed as a split-ring or as one or more pads each in the shape of a partial annulus.

Spacer 166 may be formed from a material softer than that of inner core 122 and outer core 124, so that sliding motion of inner core 122 and outer core 124 tend to cause wearing of spacer 166, rather than inner core 122 and outer core 124. Spacer 166 may be formed from a tribological favourable material combination such as composite-polymer, composite-fiber, non-ferrous or treated-ferrous material such as nitride steel.

FIG. 3 depicts a sub-assembly including inner core 122, outer core 124. Outer core 124 has a flange 170 for mounting to second core plate 136. Outer core 124 has a body 172 and a tip 174.

Tip 174 includes a second molding surface 176. In the molding position, molding surface 176 cooperates with molding surface 152 to form part of the mold cavity 103. Tip 174 may therefore be formed by high-precision custom machining.

As depicted, tip 174 is a separate component mounted to body 172. Tip 174 has a flange 178 that overlaps a corresponding flange 180 on body 172. Tip 174 is fixed to body 172 by one or more set screws 182 threaded to flanges 178, 180. In other embodiments, set screws 182 may be replaced with dowels or other fasteners which interlock tip 174 and body 172.

Body 172 may not form part of any molding surface. Accordingly, body 148 may be a standard component. Like body 148 of inner core 122, body 172 may be selected from among standard parts of one or more sizes, and a custom tip 174 may be attached thereto.

Both body 172 and tip 174 may be formed from tool steel alloys of suitable hardness. Appropriate tool steel alloys will be apparent to skilled persons. Body 172 and tip 174 of outer core 124 may or may not be formed from the same materials as body 148 and tip 150 of inner core 122. Alternatively the tip 174 may be made from a relatively thermally conductive material such as copper alloys.

Outer core 124 may have an interior passage 184, defined by an interior wall 185. Inner core 122 is received through interior passage 184 such that in the molding position, as shown in FIG. 4, tip 150 of inner core 122 is flush or near-flush with the tip 174 of outer core 124, with molding surface 152 positioned proximate molding surface 176.

Interior passage 184 may be generally cylindrical and may be sized such that clearance exists between inner core 122 and interior wall 185 of outer core 124. Interior wall 185 may define a recess near the base of inner core 124 in which a spacer 164 is retained, interposed between inner core 122 and outer core 124. Like spacer 166, spacer 164 may be a guiding element providing radial alignment, such as a plain or solid bearing without any rolling elements or a closed or split guide bushing. Spacer 164 may be formed as a sleeve extending entirely around the circumference of interior passage 184. Alternatively, spacer 164 may be formed as a split-ring or as one or more pads each in the shape of a partial annulus. Spacer 164 may be formed from a material softer than inner core 122 and outer core 124 and may or may not be formed from the same material as spacer 166 and may, for example, be formed from a tribological favourable material combination such as composite-polymer, composite-fiber, non-ferrous or treated-ferrous material such as nitride steel.

Interior wall 185 may be offset from inner core 122. Thus, outer core 124 is supported on inner core 122 by the spacers 164, 166 alone. During relative motion of inner core 122 and outer core 124, interior wall 185 of outer core 124 may slide on spacer 166. Spacer 164, which is retained in outer core 124, may slide on an outer surface of the inner core 122. Spacers 164, 166 may provide sufficient clearance to avoid direct sliding contact between inner core 122 and outer core 124.

Interior wall 185 of outer core 124 may have a tapered guide surface 188 corresponding to tapered guide 151 on the outer surface of inner core 122.

FIGS. 5A-5B depict engagement of tapered guide surfaces 151, 188 of inner core 122 and outer core 124, respectively. FIG. 5A depicts tapered guide surfaces 151, 188 in the part removal (mold open) position of mold stack 102 and FIG. 5B depicts tapered guide surfaces 151, 188 in the molding position. The degree of taper is exaggerated for purposes of illustration. Guide surfaces 151, 188 are tapered correspondingly and, as noted above, the degree of taper is typically between 1 and 10 degrees. However, in other embodiments, guide surfaces 151, 188 may be more or less tapered if the geometry of mold stack 102 permits. As mold stack 102 is moved to the molding position, outer core 124 moves towards inner core 122 and the tapered guide surfaces 151, 188 interact to force the outer core 124 into alignment with inner core 122. Conversely, while components of mold stack 102 are sliding between the molding and part removal positions, clearance may be left between tapered guide surfaces 151, 188 such that sliding contact may be avoided.

Engagement of tapered guide surfaces 151, 188 may ensure that outer core 124 is centered on inner core 122, such that tip 150 fits tightly in outer core 124, with a consistent, small clearance. A vent region 123 may be defined, located between the guide surfaces 151, 188 and molding surfaces 152, 176. Vent region 123 may permit gases to escape from mold cavity 103 during molding. Engagement of tapered guide surfaces 151, 188 may provide for a consistent fit between inner core 122 and outer core 124, with a small clearance, e.g. 0.01 mm-0.03 mm throughout vent region 123.

A tight fit of tip 150 within outer core 124 may promote heat transfer between inner core 122 and outer core 124. Since inner core 122 is actively cooled by cooling circuit 162, thermal communication between inner core 122 and outer core 124 may be important for maintaining outer core 124 at a desired temperature.

At least one spacer 194 may be mounted to the outer surface of outer core 124. Spacer 194 may be received in a corresponding recess 196 formed in the outer surface of tip 174. Spacer 194 may be a guiding element providing radial alignment, such as plain or solid bearings without any rolling elements or a closed or split guide bushing and may be formed as a sleeve extending entirely around the circumference of outer core 124. Alternatively, spacer 194 may be formed as a split-ring or as one or more pads each in the shape of a partial annulus.

FIG. 4 depicts core stack portion 108, including inner core 122, outer core 124 and the stripper sleeve 126. Stripper sleeve has an internal passage 202 through which inner core 122 and outer core 124 are received. Interior passage 202 is defined by an interior wall 204 with a clearance between interior wall 204 and an outer surface of the outer core 124.

Interior wall 204 has a recess 207 for receiving a spacer 192 near a base of the stripper sleeve 126. Spacer 192 may, for example, be plain or solid bearings without any rolling elements and may be formed as a sleeve extending entirely around the circumference of interior passage 202. Alternatively, spacer 192 may be formed as a split-ring or as one or more pads each in the shape of a partial annulus.

Spacers 192, 194 may or may not be formed from the same material. Each spacer 192, 194 may be formed from a material softer than that of a stripper sleeve 126 and the outer core 124, so that sliding motion of stripper sleeve 126 and outer core 124 tend to cause wearing of spacers rather than stripper sleeve 126 and outer core 124. Spacers 192, 194 may, for example be formed from a tribological favourable material combination such as composite-polymer, composite-fiber, non-ferrous or treated-ferrous material such as nitride steel.

Stripper sleeve 126 is supported on outer core 124 by spacers 192, 194 so that direct contact between interior wall 204 and outer core 124 may be avoided. During relative motion of stripper sleeve 126 and outer core 124, stripper sleeve 126 may slide along spacer 194 and spacer 192 may slide along outer core 124. Like spacers 164, 166, 194, spacer 192 may be formed of a material softer than that of outer core 124 and stripper sleeve 126 so that such sliding tends to cause wearing of the spacers rather than inner core 124 and stripper sleeve 126.

Stripper sleeve 126 has a flange 209 at its end. Flange 209 extends toward outer core 124 and defines a part-engaging surface 211. Part-engaging surface 211 is positioned at a specific distance from stroke axis 101, such that extension of stripper sleeve 126 in the part removal position causes part-engaging surface 211 to contact part 104 and push part 104 off of outer core 124. Flange 209 may be sized so that clearance exists between flange 209 and outer core 124. Thus, sliding contact between flange 209 and outer core 124 may be avoided.

Figure 6A:
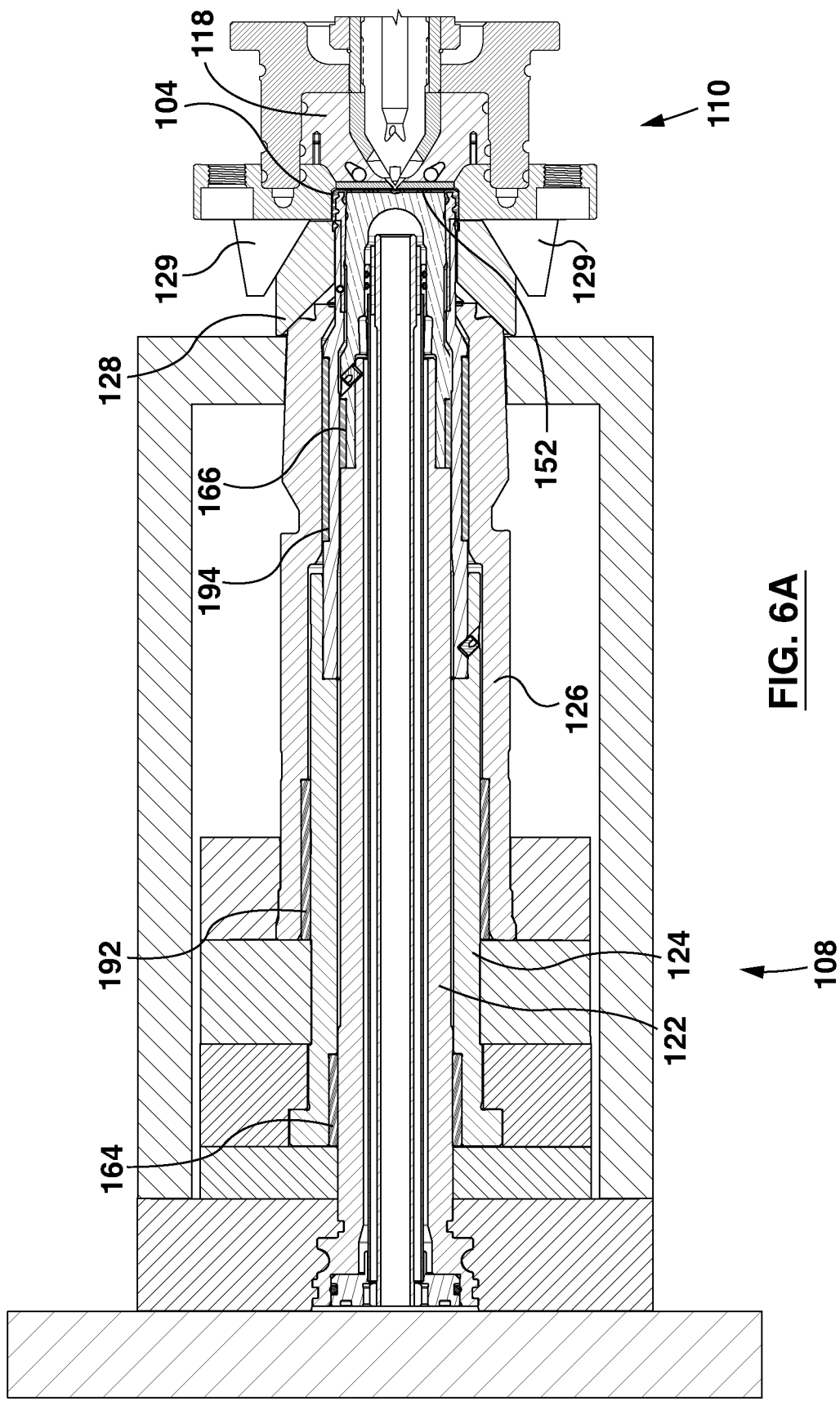

As noted, core stack portion 108 further includes slides 128. Slides 128 are movable in a transverse direction, perpendicular to axis 101. In the molding position of mold stack 102, slides 128 fit closely around the outer core 124 and cooperate with outer core 124 to define an undercut portion of mold surface 121 (e.g. to mold bridges that connect a tamper band to a shell of a closure; (FIGS. 1, 5, 6A, 7D)(. In the part release position, slides 128 are moved laterally outwardly to release the molded part 104 (FIG. 7B). Slides 128 may be used, for example, to form undercut features in molded parts 104.

Stripper sleeve 126 is configured to move slides 128 outwardly when mold stack 102 is moved to the part release position. The end of stripper sleeve 126 has a cam surface 210. Slides 128 have corresponding cam follower surfaces 212. When stripper sleeve 126 is axially extended, each cam surface 210 bears against the corresponding cam follower surface 212, causing slides 128 to spread away from axis 101.

Figure 1B:
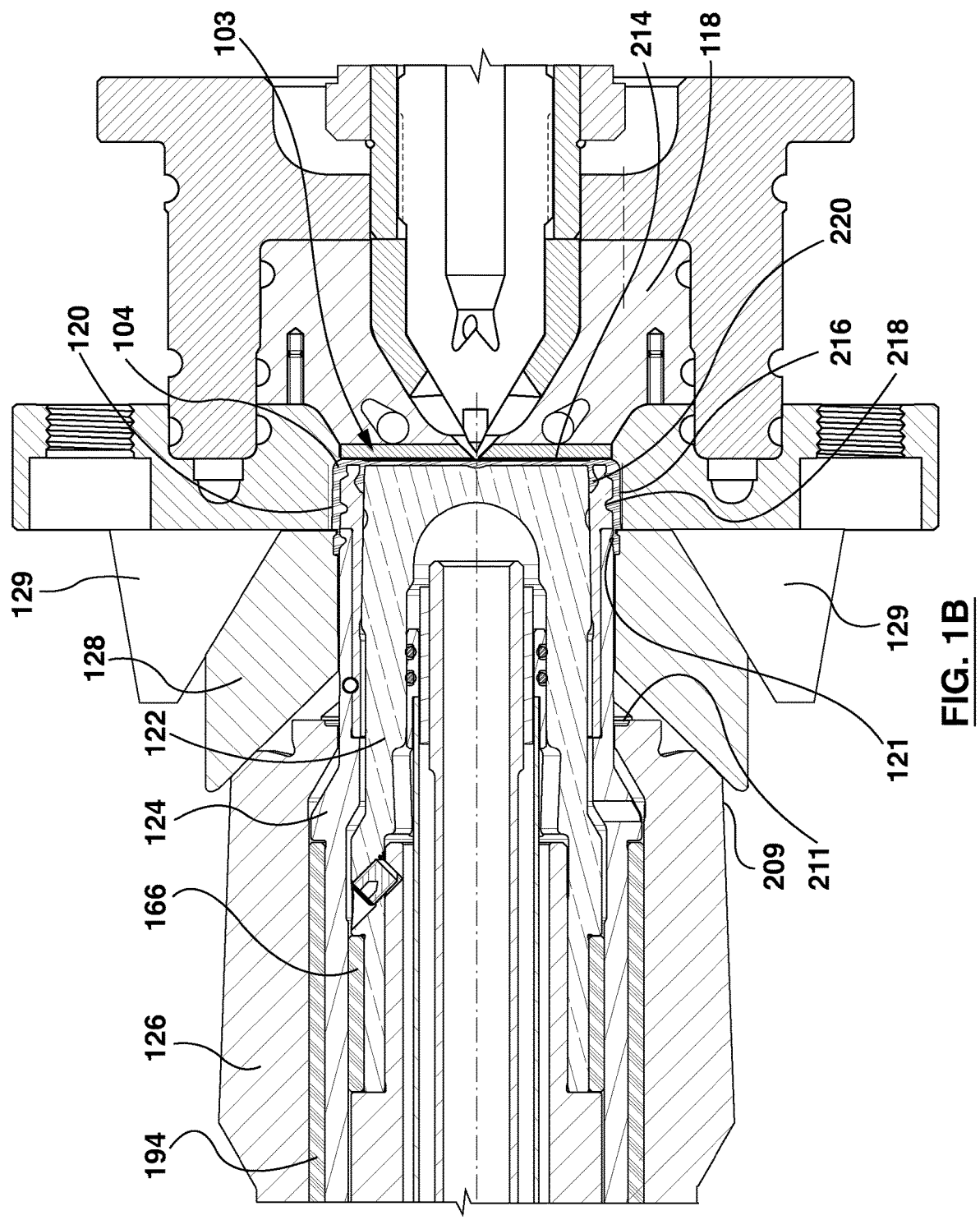
FIG. 1B is an enlarged cross-sectional view of a portion of the mold stack of FIG. 1A.

As best illustrated in FIG. 1B, configuration of the mold cavity 103 is depicted in detail. As noted mold cavity 103 is configured to form part 104, for example, a bottle closure. Part 104 has a top panel 214 and a shell 216 depending from top panel 214. Shell 216 has internal threads 218. An annular plug seal 220 depends from top panel 214.

Inner core 122, outer core 124 and slides 128 cooperate to form the features of part 104. Specifically, end portion 152 of inner core 122 defines the bottom surface of top panel 214. End portion 176 of outer core 124 defines the inner surface of shell 216 and threads 218. End portion 150 of inner core 122 and end portion 176 of outer core 124 cooperatively define an annular recess that forms plug seal 220. As apparent from FIG. 1b, plug seal 220 and threads 218 are undercuts. Plug seal 220 is trapped between inner core 122 and outer core 124. Shell 216 and threads 218 are trapped between outer core 124 and slides 128.

Accordingly, in the part removal position, outer core 124 is axially extended relative to inner core 122 and stripper sleeve 126 is axially extended relative to outer core 124. Extension of outer core 124 releases plug seal 220. Extension of stripper sleeve 126 spreads slides 128, which releases the undercut parts of the shell 216. Extension of stripper sleeve 126 also pushes part 104 off of the mold core.

As noted, injection molding machine 100 operates in cycles. FIGS. 6A-6F and 7A-7D depict mold stack 102 in various stages of a cycle of injection molding machine 100. A molding cycle begins with mold stack 102 in the molding position, as depicted in FIG. 6A, with the mold clamped between the movable and stationary platens. As noted above, in the molding position, inner core 122 and outer core 124 are clamped together such that tapered sections 151, 188 tightly nest together.

End portion 152 of inner core tip 150 is received through passage 184 of outer core 124 and is positioned proximate end portion 176. Slides 128 are held inwardly by slide actuators 129 (e.g. cams) protruding from cavity stack portion 110. Mold cavity 103 is cooperatively defined by end portion 152 of inner core tip 150, end portion 176 of outer core tip 174 and slides 128, along with cavity assembly 118.

Molten molding material is injected into mold cavity 103 through a gate channel (not shown) defined in the cavity mold half. The molding material is allowed to cool and harden under pressure in mold cavity 103. Once part 104 is sufficiently cooled and hardened, mold stack 102 is opened, i.e., moved to the part removal position, to permit the part to be removed from mold cavity 103.

Figure 6B:
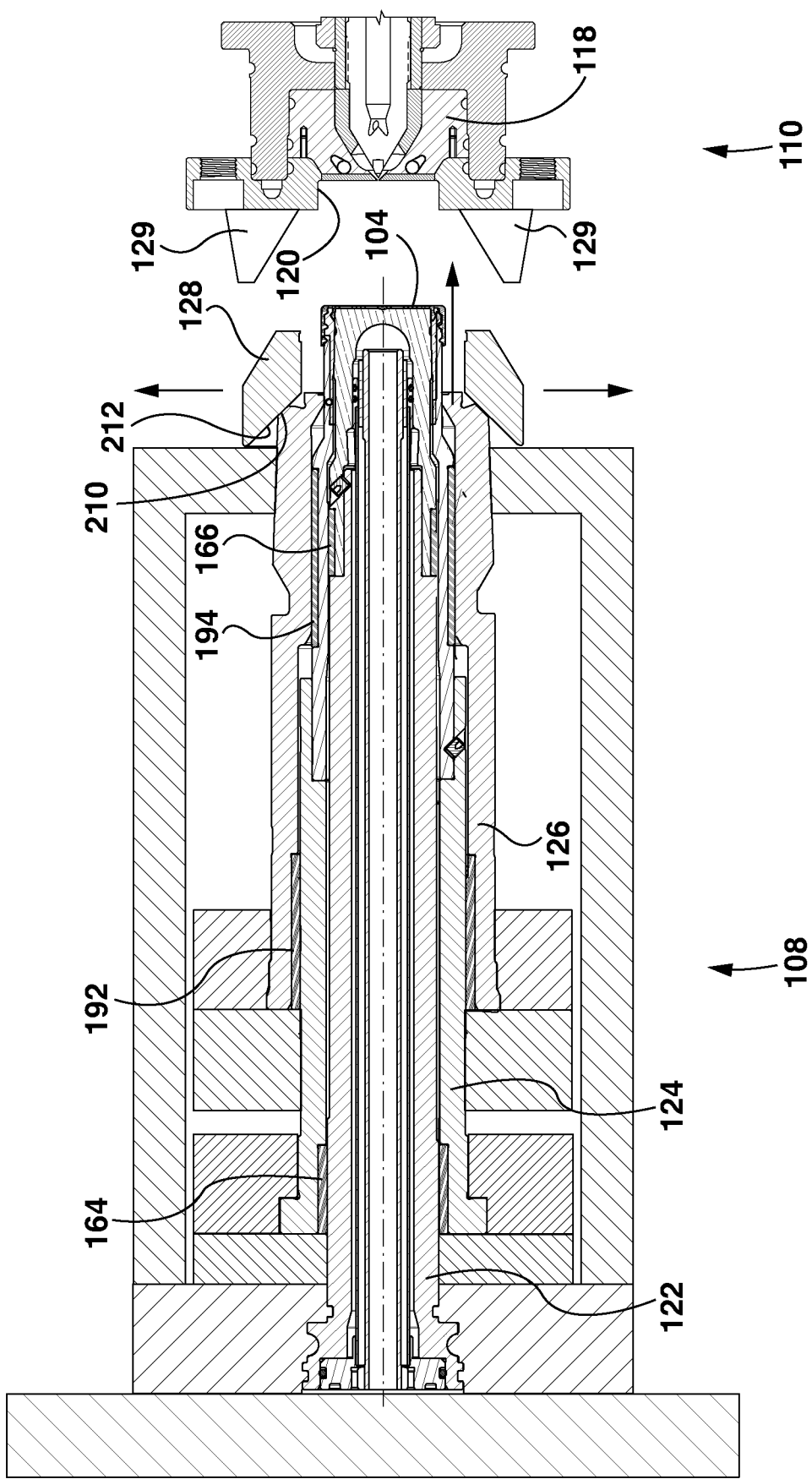

As depicted in FIG. 6B, the moveable mold half is axially retracted away from the stationary mold half, providing space between cavity stack portion 110 and core stack portion 108. As depicted in FIGS. 6B-6C, stripper sleeve 126 is axially extended by movement of stripper retainer plate 140 and stripper clamp plate 142. During axial extension, stripper sleeve 126 may slide along spacers 192, 194 without making sliding contact with outer core 124.

As stripper sleeve 126 is extended, cam surfaces 210 bear against cam followers 212, moving slides 128 transversely away from axis 101. With slides 128 withdrawn, shell 216 and threads 218 have room to move or deflect outwardly from inner core 122 and outer core 124. In other words, once slides 128 are withdrawn, shell 216 and threads 218 are no longer trapped between outer core 124 and slides 128.

Figure 6D:
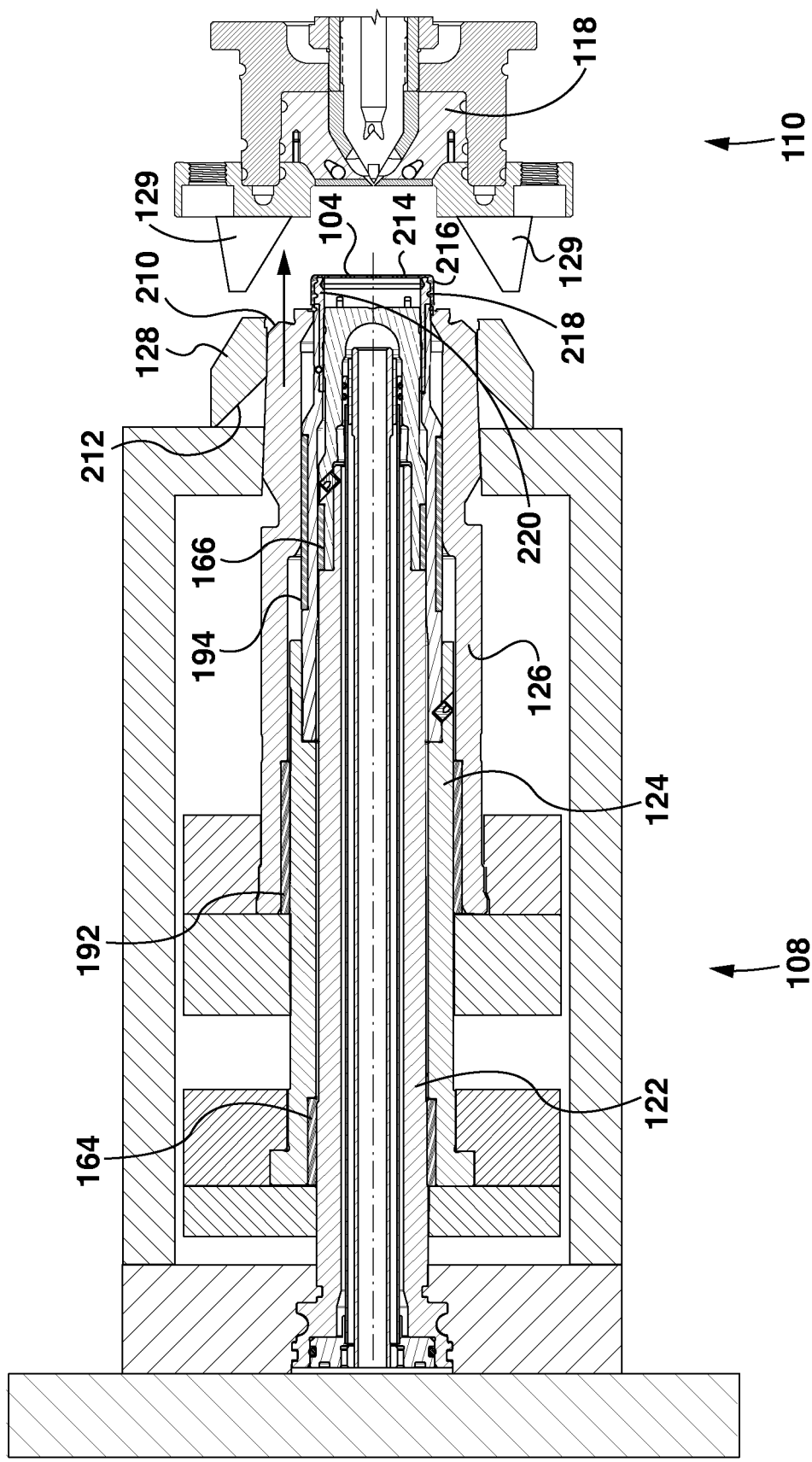

As depicted in FIG. 6D, outer core 124 may be axially extended relative to inner core 122 by movement of second core plate 136 and second clamp plate 138 relative to moving platen 114. During axial extension, outer core 124 may slide along spacers 164, 166 without making sliding contact with inner core 122. Extension of outer core 124 relative to inner core 122 pulls tapered guide surface 188 of outer core 124 out of engagement with tapered guide surface 151 of inner core 122 (see FIG. 5A).

Part 104 is carried on outer core 124, such that extension of outer core 124 relative to inner core 122 likewise moves part 104 away from inner core 122. Extension of outer core 124 relative to inner core 122 therefore provides clearance for plug seal 220. That is, extension of outer core 124 provides room for plug core to move or deflect inwardly from outer core 124. Thus, with outer core 124 axially extended, plug seal 220 of part 104 is no longer trapped between outer core 124 and inner core 122.

Figure 6E:
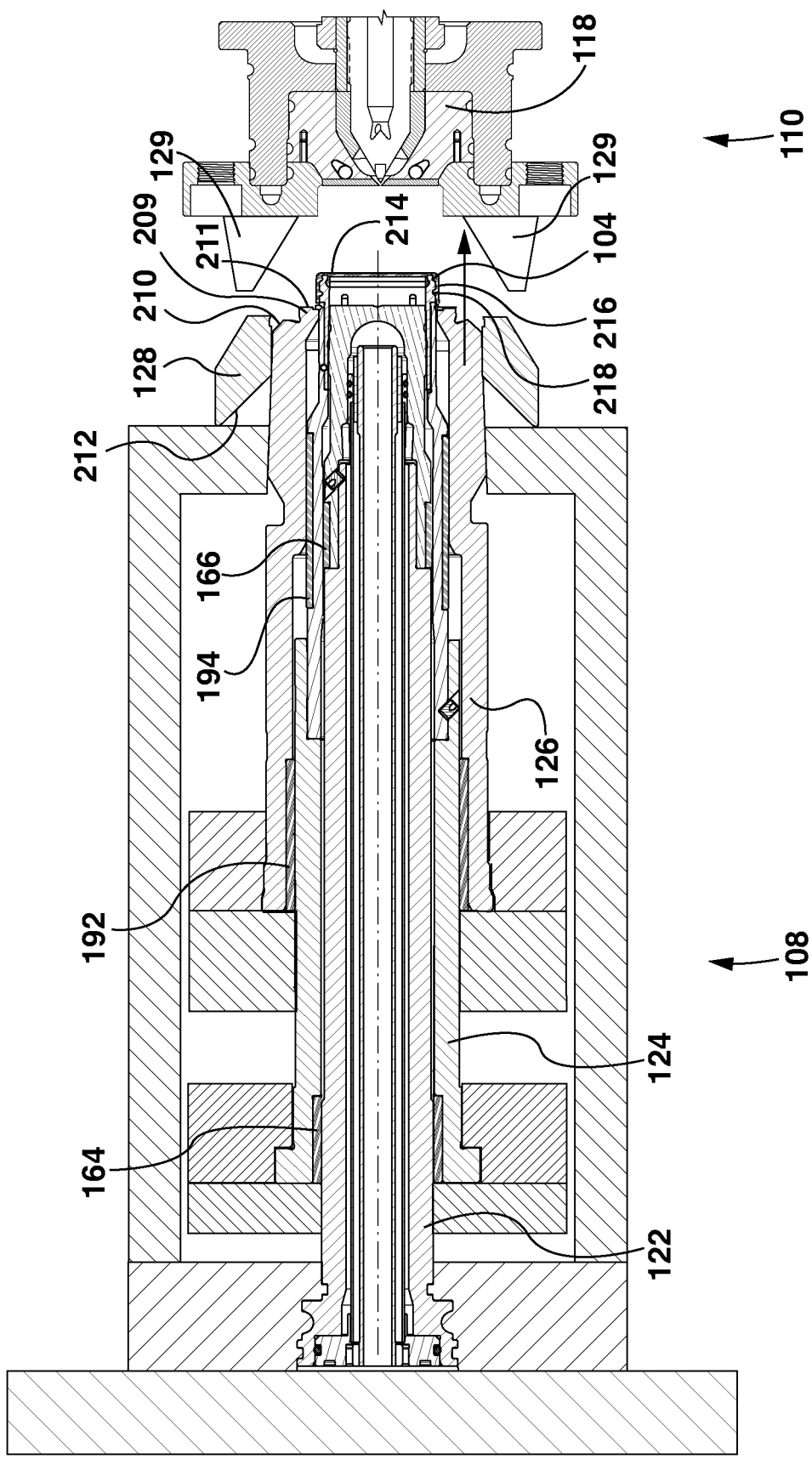
Figure 6F:
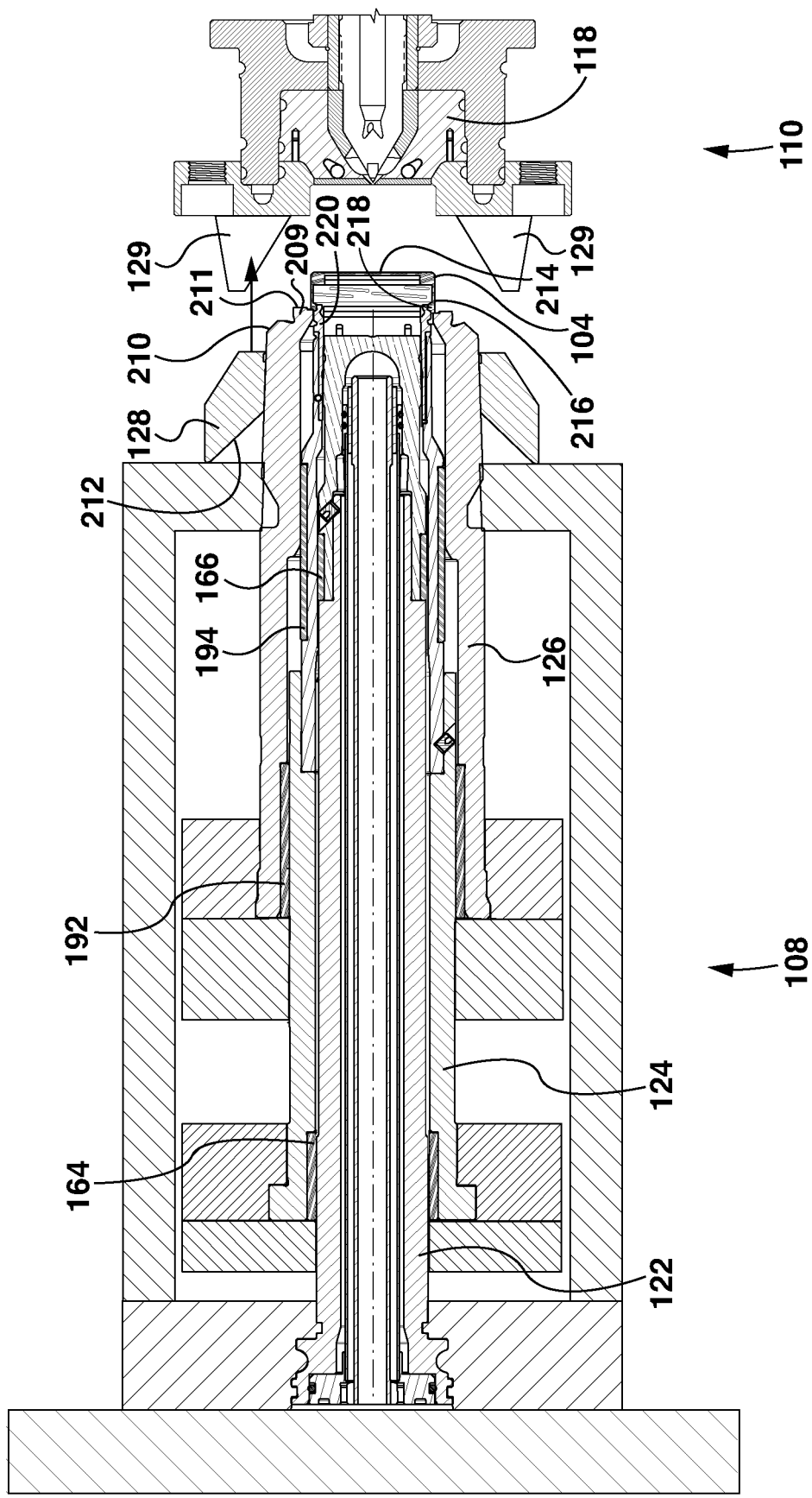

Stripper sleeve 126 may also continue to extend axially after slides 128 have been moved outwardly. As best shown in FIG. 6E-6F, extension of stripper sleeve 126 causes flange 209 of stripper sleeve 126 to contact shell 216 of part 104 (more particularly a tamper evident band), pushing part 104 off of the outer core 124. Such pushing may cause part 104 to pop off of outer core 124. Shell 216 and threads 218 may deflect outwardly away from outer core 124, plug seal 220 may deflect inwardly away from outer core 124.

Once part 104 is removed, injection molding machine and mold stack 102 are returned to the molding position, as shown in FIGS. 7A-7D.

Figure 7A:
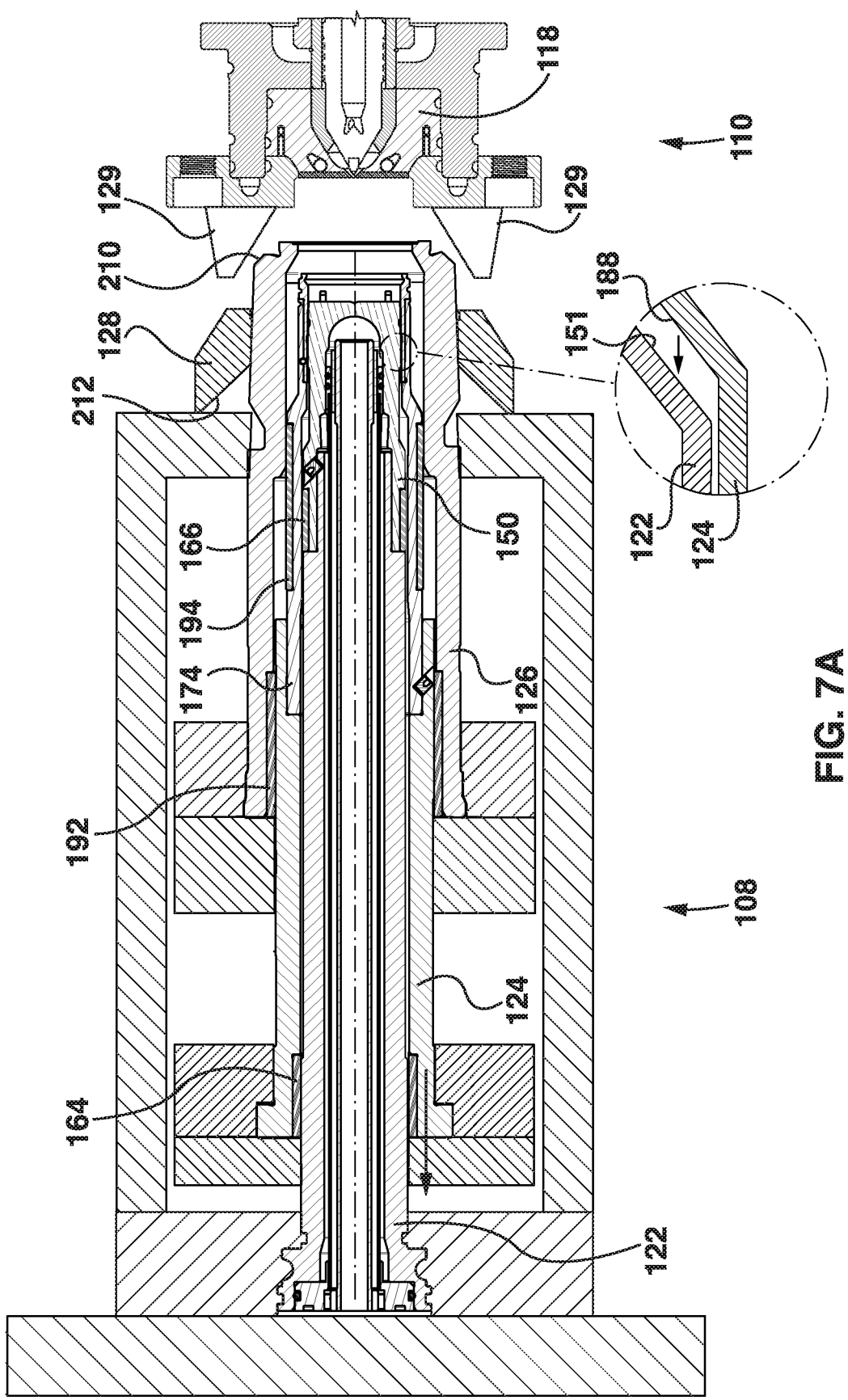
FIGS. 7A-7D are cross-sectional views of the mold and mold stack of FIG. 1A in various stages of movement from the part removal position to the molding position.
Figure 7B:
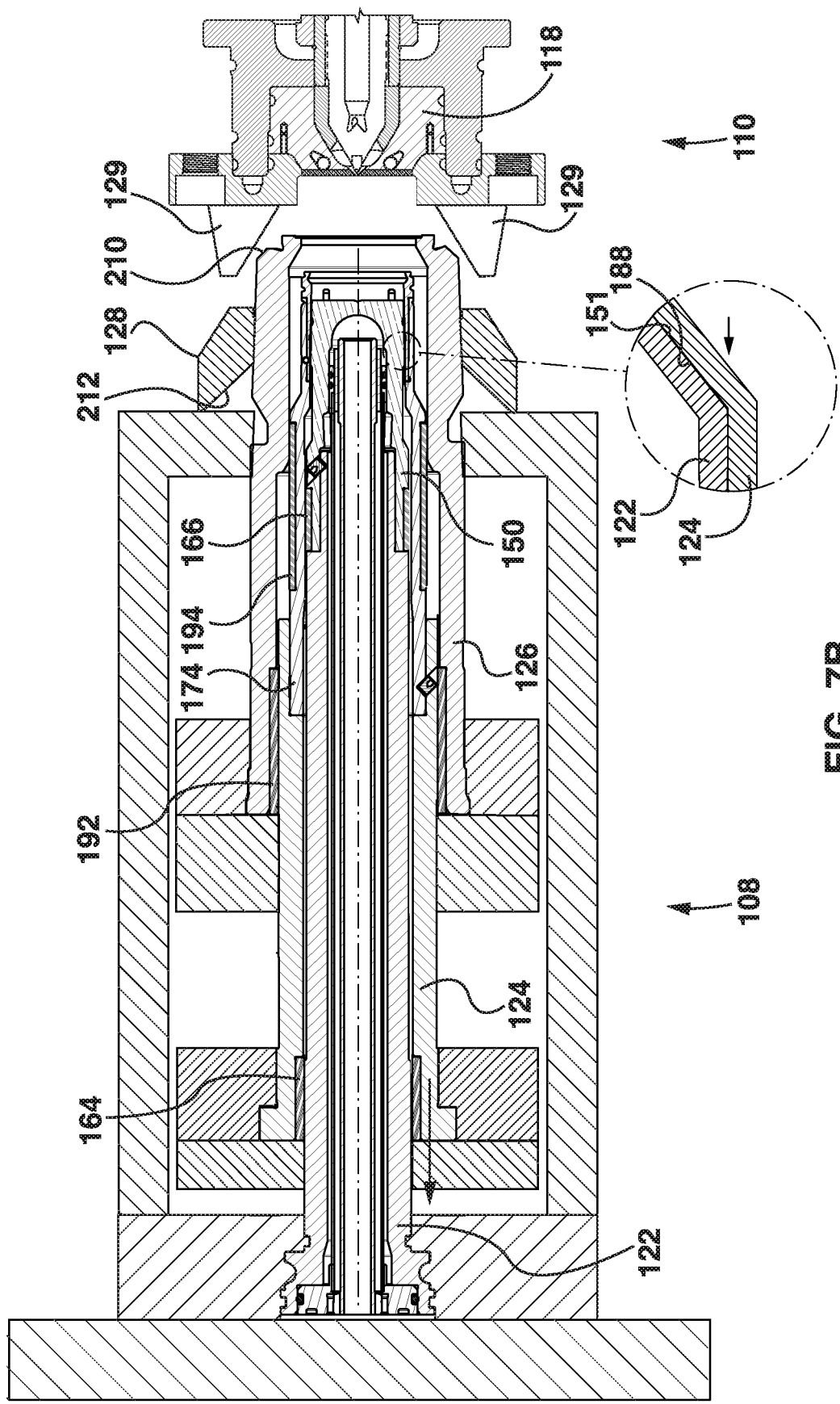

As shown in FIG. 7A-7B, outer core 124 is axially retracted relative to inner core 122 by movement of second core plate 136 and second clamp plate 138 relative to moving platen 114. Outer core 124 may slide along spacers 164, 166 without making sliding contact with inner core 122. As outer core 124 reaches its molding position, tapered guide surface 188 of outer core 124 engages tapered guide surface 151 of inner core 122. If outer core 124 is not correctly aligned, tapered guide surfaces 151 and 188 progressively bear against one another to pull outer core 124 into correct alignment with inner core 122.

Figure 7C:
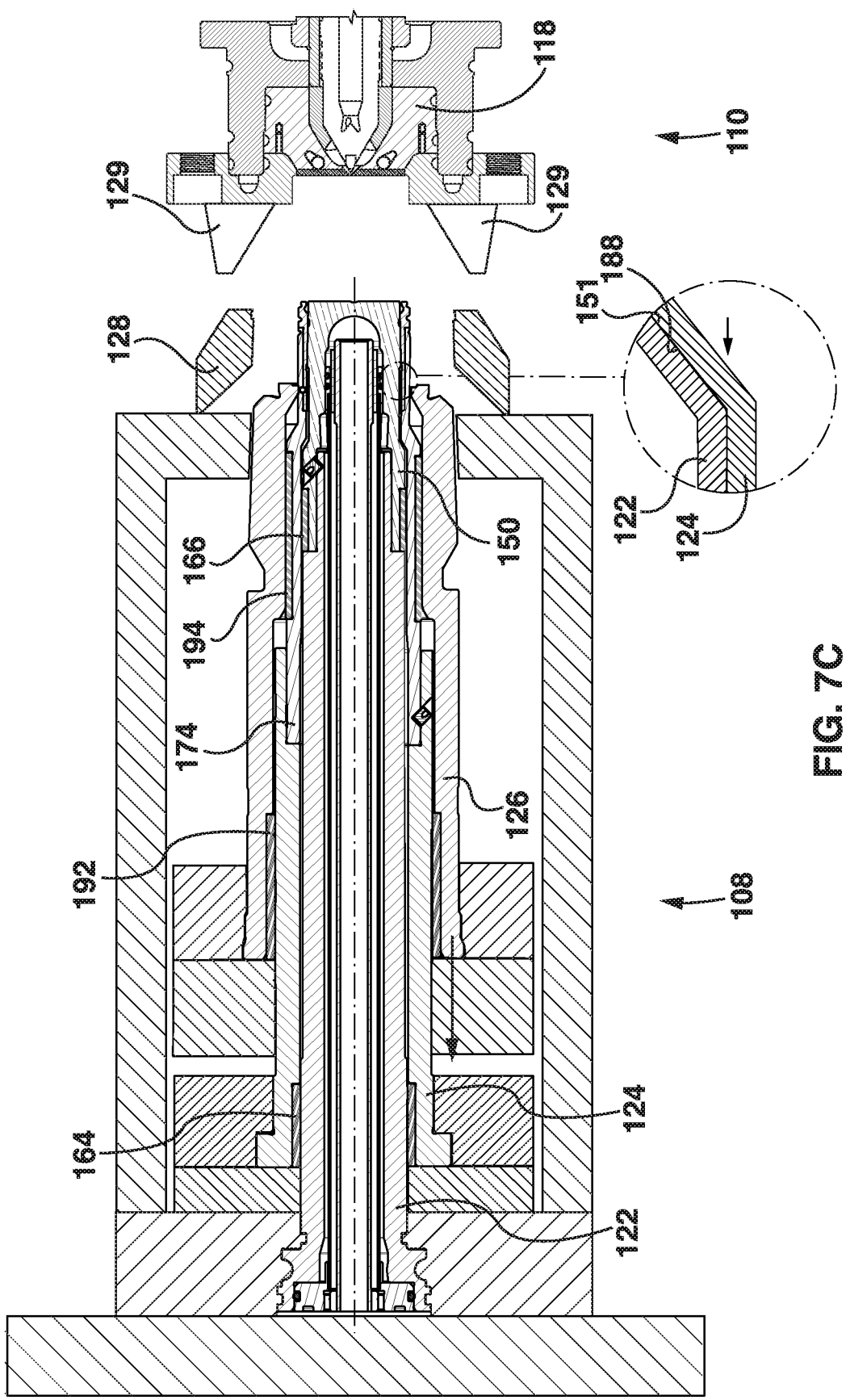

As shown in FIG. 7C, stripper sleeve 126 is axially retracted relative to inner core 122 and outer core 124 by movement of stripper retainer plate 140 and stripper clamp 142 relative to moving platen 114. During axial retraction, stripper sleeve 126 may slide along spacers 192, 194 without making sliding contact with outer core 124.

Figure 7D:
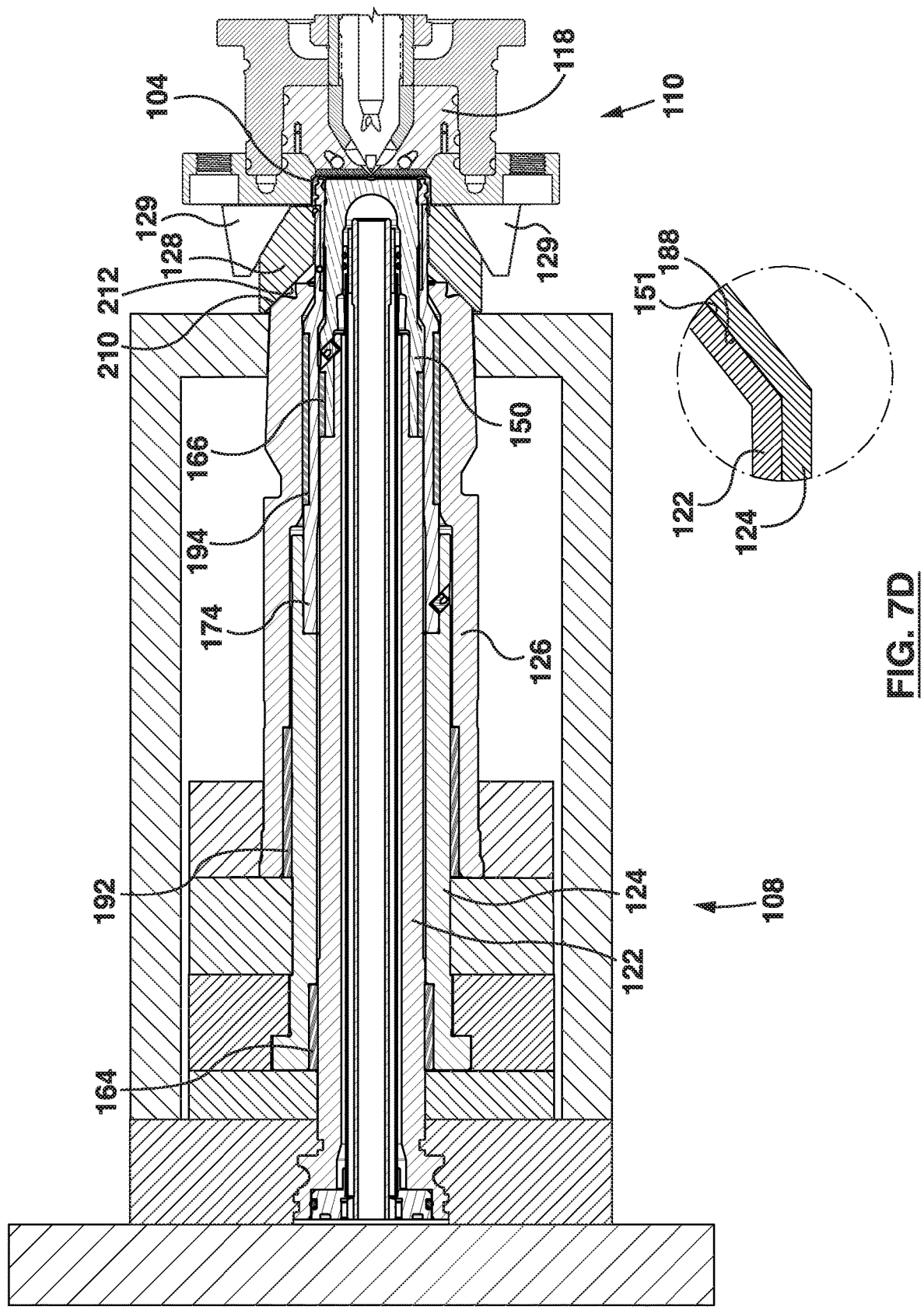

As shown in FIG. 7D, mold stack 102 is closed by moving the moving platen toward the fixed platen and clamping the platens together. As mold stack closes, actuators 129 protruding from cavity stack portion 108 engage slides 128, causing the slides to move transversely toward axis 101. Mold stack 102 is returned to the molding position when fully closed, with portions of inner core 122, outer core 124 and slides 128 cooperating with the mold cavity to define mold cavity 103.

Sliding contact of components during movement of mold stack may cause wearing. Therefore, mold stack 102 is configured so that inner core 122, outer core 124 and stripper sleeve 126 slide against spacers 164, 166, 192, 194. Direct sliding contact between inner core may be avoided. Spacers 164, 166, 192, 194 may be formed from a softer material than inner core 122, outer core 124 and stripper sleeve 126, so that sliding tends to wear the spacers rather than the inner core 122, outer core 124 and stripper sleeve 126.

Moreover, as noted, inner core 122 and outer core 124 may be formed as multi-part assemblies, with custom-machined tips 150, 174 removably attached to bodies 148, 172 of standard sizes. Spacers 164, 166, 192, 194 may also be formed in standard sizes, corresponding to sizes of bodies 148, 172. Spacers 164, 166, 192, 194 may be positioned such that they slide against the bodies 148, 172 and not against tips 150, 174. Thus, sliding interfaces may be restricted to standardized components, which may further reduce wear on custom-machined tips 152, 174. As will be apparent, custom-machined tips 152, 174 may be more expensive and time consuming to repair and replace than standard components.

In some embodiments, tapered guide surfaces 151, 188 may be formed on the tips 152, 174 of inner core 122 and outer core 124. Thus, alignment of inner core 122 and 124 may be achieved by tips 152, 174.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed:

1. A mold stack for a mold, comprising:
    a cavity assembly defining an outer molding surface;
    a mold core configured for reception in said cavity assembly, said mold core comprising:
        a first core member having a first inner molding surface;
        a passage extending through said first core member, said passage having first tapered guide surface;
        a second core member received in said passage, said second core member having a second inner molding surface and a second tapered guide surface;
        a spacer slidably supporting said first core member on said second core member;
        said first core member movable relative to said second core member, between a molding position in which said first and second inner molding surfaces cooperate with said outer molding surface to define a mold cavity, and an open position in which said first core member is extended relative to said second core member, wherein said first and second tapered guide surfaces engage one another to align said first and second core members in said molding position.

2. The mold stack of claim 1, further comprising a third core member, wherein said first core member is received in an internal passage through said third core member, wherein said third core member is slidably supported on said first core member by a spacer.

3. The mold stack of claim 2, wherein said third core member is a stripper sleeve, said stripper sleeve having a part-engaging surface for pushing a molded part off of said mold core, wherein said part-engaging surface is offset from said first core member.

4. The mold stack of claim 1, wherein at least one of said first core member and said second core member comprises a removable tip, wherein said first molding surface or said second molding surface is formed on said removable tip.

5. The mold stack of claim 4, wherein each one of said first core member and said second core member comprises a removable tip, wherein said first molding surface and said second molding surface are formed on said removable tips.

6. The mold stack of claim 4, wherein said removable tips are fixed by interlocking fasteners.

7. The mold stack of claim 6, wherein said removable tips are fixed by set screws.

8. The mold stack of claim 4, wherein said first tapered guide surface and said second tapered guide surface are formed on said removable tips.

9. The mold stack of claim 1, comprising a first spacer received in a recess in said first core member and a second spacer received in a recess in said second core member, said first core member slidably supported on said second core member by said first and second spacers.

10. The mold stack of claim 1, wherein said spacer is formed from a material having lower hardness than both of said first core member and said second core member.

11. A mold core for a mold stack of a mold, comprising:
    a first core member with an internal passage extending therethrough, said first core member having a first tapered guide surface in said internal passage;
    a second core member received in said internal passage, said second core member having a second tapered guide surface corresponding to said first tapered guide surface;
    a spacer interposed between said first core member and said second core member, said spacer slidably supporting said first core member on said second core member;
    said first core member movable relative to said second core member from an open position to a molding position, wherein in said molding position, said first and second core members cooperatively define an inner molding surface and said second tapered guide surface engages said first tapered guide surface to align said first and second core members.

12. The mold core of claim 11, further comprising a third core member, wherein said first core member is received in an internal passage through said third core member, wherein said third core member is slidably supported on said first core member by a second spacer.

13. The mold core of claim 12, wherein said third core member is a stripper sleeve, said stripper sleeve having a part-engaging surface for ejecting a part from said mold core, wherein said part-engaging surface is offset from said first core member.

14. The mold core of claim 11, wherein at least one of said first core member and said second core member comprises a removable tip.

15. The mold core of claim 14, wherein each one of said first core member and said second core member comprises a removable tip, wherein said removable tips cooperate to define said molding surface in said molding position.

16. The mold core of claim 14, wherein said removable tips are fixed by interlocking fasteners.

17. The mold core of claim 16, wherein said removable tips are fixed by set screws.

18. The mold core of claim 14, wherein said first tapered guide surface and said second tapered guide surface are formed on said removable tips.

19. The mold core of claim 11, comprising a first spacer received in a recess in said first core member and a second spacer received in a recess in said second core member, said first core member slidably supported on said second core member by said first and second spacers.

20. The mold core of claim 11, wherein said spacer is formed from a material having lower hardness than both of said first core member and said second core member.

\* \* \* \* \*